Patented Dec. 14, 1948

2,455,999

UNITED STATES PATENT OFFICE 2,455,999

METHOD OF PREPARING ORGANOSILICONES

James Franklin Hyde, Corning, N. Y., assignor to Corning Glass Works, Corning, N. Y., a corporation of New York No Drawing. Application August 1, 1944, Serial No. 547,641

13 Claims. (Cl. 260—448.2)

This invention relates to the preparation and use of the organic compounds of silicon which are known as the silicones, more particularly the lower alkyl silicones, such as dimethyl, diethyl, dipropyl, dibutyl and diamyl silicones, the alkyl aryl silicones, such as phenyl methyl and phenyl ethyl silicones, and the diaryl silicones such as diphenyl silicone. In the chemical literature the term "silicone" refers to those silicon compounds in which two organic groups and oxygen are combined with silicon according to the general formula $R_2SiO$, R being an organic radical. In other words silicones are di-organo substituted silicon oxides. Inasmuch as silicon, unlike carbon, does not form a stable double bond with oxygen, the silicones in general are polymeric and the unit structure is

As used herein, the term "silicone" excludes the mono-organo substituted oxides of silicon which are also polymeric and are represented by the unit structure

As a further distinction over instances where "methyl silicone" is used to include the monosubstituted compound, the term "dimethyl silicone" will be used herein to designate the compound $(CH_3)_2SiO$ having the polymeric unit structure

Likewise the terms "diethyl silicone," "dipropyl silicone," "dibutyl silicone," "diamyl silicone," "phenyl methyl silicone," "phenyl ethyl silicone," "diphenyl silicone," etc. herein refer only to the corresponding oxides and unit structures containing the corresponding alkyl radicals, or aryl radicals as the case may be, in place of the methyl radicals. The term "organo-siloxane" as hereinafter used refers generically to all those compositions, including the silicones, which contain the $\equiv Si-O-Si\equiv$ linkage and organic radicals attached to silicon through carbon-silicon linkages.

This application is a continuation-in-part of my copending application Serial No. 432,529, filed February 26, 1942, now U. S. Patent 2,438,478 and assigned to the assignee of the present invention. In application Serial No. 432,529, it was shown that organo-siloxanes which contained recurring structural units corresponding to the formula $R_2SiO$ could be depolymerized by heating to elevated temperatures, preferably in the presence of small amounts of solid caustic alkali, where R represents an alkyl radical. It has since been found that the invention is of broader scope as will be shown below.

The primary object of this invention is to provide methods of preparing pure di-organo silicones having the general formula $RR'SiO$, where R and R' are organic radicals selected from the class consisting of alkyl and aryl radicals.

Another object of this invention is to produce pure dialkyl silicones.

Another object of this invention is to produce pure alkyl aryl silicones.

Another object is to prepare dialkyl silicones from mixtures of the respective mono- and dialkyl silicols.

Another object is to separate a dialkyl silicone from a copolymer containing a mono-alkyl silicon oxide.

Another object is to produce pure dimethyl silicone.

Another object is to produce polymeric dimethyl silicone which is substantially free from monomethyl silicon oxide.

Another object is to prepare dimethyl silicone from a mixture of mono- and di-methyl silicols in a simple and efficient manner without loss or contamination of the silicone.

Another object is to separate dimethyl silicone from mixtures and co-polymers of dimethyl silicone with the monoalkyl or monoaryl silicon oxides.

Another object is to separate dimethyl silicone from a resinous co-polymer containing mono- and di-methyl silicon oxides.

Another object is to isolate low molecular weight polymers of dimethyl silicone from the higher polymers thereof.

Another object is to convert insoluble polymers of dimethyl silicone into soluble polymers thereof.

To these and other ends this invention comprises the methods to be hereinafter more fully described and claimed.

Hitherto there has been no wholly suitable, that is, no economically practical and commercially adaptable, method for preparing dimethyl silicone and it has not been possible to separate it from coplymers and mixtures containing monomethyl silicon oxide or other mono-organo silicon oxides. In my copending application, Serial No. 353,302 filed August 19, 1940, now U. S. Patent 2,371,050, I have shown that dimethyl silicone can be prepared by hydrolyzing dimethyl silicon dichloride as follows: The latter compound is obtained by the Grignard reaction on silicon tetrachloride which produces a mixture of methyl silicon chlorides in accordance with the following reactions:

$$CH_3MgBr + SiCl_4 \rightarrow CH_3SiCl_3 + MgBrCl$$

$$CH_3MgBr + CH_3SiCl_3 \rightarrow (CH_3)_2SiCl_2 + MgBrCl$$

$$CH_3MgBr + (CH_3)_2SiCl_2 \rightarrow (CH_3)_3SiCl + MgBrCl$$

The dimethyl silicon dichloride is then separated from the mixture of chlorides and purified by fractional distillation. The purified product is hydrolyzed by pouring it into an excess of water, preferably kept cold, and the silicone is formed by a spontaneous condensation of the diol or hydrolysis product.

$$(CH_3)_2SiCl_2 + 2H_2O \rightarrow (CH_3)_2Si(OH)_2 + 2HCl$$

$$(CH_3)_2Si(OH)_2 \rightarrow (CH_3)_2SiO + H_2O$$

the two reactions probably, to some extent at least, occuring simultaneously. The separation of the dimethyl silicon dichloride from the monomethyl silicon trichloride by fractional distillation is extremely difficult because the boiling points of the two compounds are 70° C. at 745 mm. and 67.5° C. at 738 mm. respectively, and it is necessary to rectify them repeatedly with a highly efficient fractionating column.

Although a variation in the molar proportions of the reactants in the above described Grignard reaction will cause a variation in the relative proportions of the methyl silicon chlorides which are formed, a mixture thereof, probably also containing some unreacted silicon tetrachloride, will always result. The hydrolysis of such a mixture of chlorides results in a mixture of the corresponding silicols or hydroxy compounds which readily condense with loss of water and the resulting product is not dimethyl silicone but is a copolymeric mixture containing mono-, di-, tri- and unsubstituted silicon atoms. It has not heretofore been possible to separate such a mixture and to obtain therefrom the dimethyl silicone per se.

I have now discovered a simple and efficient method of preparing dimethyl silicone and other di-organo silicones from the mixed hydrolysis products of the kind referred to above and from the polymeric mixtures resulting from the condensation and dehydration of such hydrolysis products. The method is applicable for the recovery or separation of low polymers of dimethyl silocone, other di-alkyl silicones, alkyl aryl silicones and diaryl silicones from insoluble polymers thereof or from their copolymeric mixtures with silicon oxides, mono-organo silicon oxides, or tri-organo silicon oxides in general.

I have discovered that when high polymers of dimethyl silicone are heated to suitable temperatures the siloxane linkages by which the structural units are bound, are capable of rearrangement, making depolymerization possible. Thus, highly polymerized dimethyl silicone is depolymerized by heating it to about 275° C. to 300° C. or above, and thereby is converted from high molecular weight to low molecular weight polymers having sufficiently low boiling points to permit their distillation. The mono-organo silicon oxides, on the other hand, become highly polymerized by heat to a solid undistillable residue. However, during depolymerization and distillation of the silicone noticeable amounts of both mono- and unsubstituted silicon, if present, may also be carried over with the distillate. This is more noticeable and hence objectionable when the method is applied to fresh hydrolysis products or incompletely condensed mixtures and makes a redistillation necessary in order to obtain complete separation of the silicone. I have found that the introduction into the still of a small amount of a preferably solid caustic alkali such as sodium hydroxide before distillation will overcome the difficulty and the silicone may be thus distilled uncontaminated.

The dimethyl silicone produced by my method is an oily liquid which is immiscible with water but soluble in organic solvents. The identity and purity of the dimethyl silicone is clearly and positively established by analytical determinations of the silicon content as $SiO_2$, the accuracy of which far exceeds the accuracy of known methods for the determination of carbon and hydrogen. To determine the silicon content, that is, the $SiO_2$ equivalent, I weigh the sample in a test tube composed of fused quartz. The sample is then cautiously decomposed with repeated additions of nitric acid and heating to oxidize and drive off all organic matter after which the residual pure silica is ignited to constant weight and its percentage of the sample is calculated. Since the entire determination is carried out in one container without loss or attrition of the sample, the method has proved to be highly accurate and the experimental error does not exceed about 0.05%. The $SiO_2$ equivalent to the theoretical silicon content of dimethyl silicone is 81.08% $SiO_2$ and repeated analyses of distillates obtained by my methods have given values so consistently close to the theoretical as to leave no doubt that the distillate contains two methyl groups per silicon atom and corresponds to the formula $(CH_3)_2SiO$. It is a mixture of numerous polymers, the two lowest or simplest of which I have isolated and identified, as will be shown.

The other alkyl silicones, including ethyl, propyl, butyl and amyl, the alkyl aryl silicones, including phenyl methyl and phenyl ethyl, and the diaryl silicones including diphenyl, can be prepared in a similar manner by distilling the hydrolysis products of the respective substituted silicon chlorides resulting from the reactions of the appropriate Grignard reagents on silicon tetrachloride analogous to those recited above for the methyl Grignard reagent. I have found that the method is generally applicable to any organo-siloxane which comprises essentially the structural unit RR'SiO where R and R' are organic radicals selected from the class consisting of alkyl and aryl radicals. The organo-siloxane may have been prepared as described above, that is, by hydrolyzing the crude Grignard product, or it may have been prepared by hydrolyzing synthetic mixtures of previously purified silanes in which the hydrolyzable radicals need not be a halogen but may be an alkoxy radical, an aroxy radical, or an amino group.

The following examples will illustrate the invention.

*Example I*

A mixture of the methyl silicon chlorides was prepared by the Grignard reaction, for instance, by slowly adding an ether solution of methyl magnesium bromide to an ether solution of silicon tetrachloride in the proportion two mols of the Grignard to one mol of the silicon tetrachloride, the reaction mixture being suitably cooled to prevent rise of temperature above 20° C. The resulting mixture of chlorides was hydrolyzed to form the corresponding silicols, by pouring it into ice water. The ether layer which contained the condensation products was washed, to remove magnesium salts and hydrochloric acid formed during hydrolysis and the ether was recovered by distillation. The product was a mobile liquid comprising mono- and di-methyl hydroxy compounds and condensation products with a trace of the trimethyl compound. The latter did not interfere with the subsequent separation of the silicone.

The mixture of hydrolysis products remaining after the evaporation of the ether was placed in a still, with addition of amout .1% of solid NaOH, and heated. Distillation of the silicone began at about 135° C. and a partially crystalline distillate was collected which was composed of low molecular weight polymers having a cyclic structure. The average molecular weight of the distillate increased with the temperature of distillation. In the neighborhood of 275° C., when about one-fifth of the initial mixture has distilled, the remaining higher polymers which may have formed during heating began to depolymerize and the average molecular weight of the distillate ceased to increase. As stronger heat was applied, the temperature of the contents of the still could be increased nearly to red heat without substantially increasing the temperature at which the vapor condensed. Under these conditions depolymerization and rate of distillation became very rapid. The distillate comprised substantially all of the dimethyl silicone.

On redistillation I have found that low polymers of dimethyl silicone, having definite melting and boiling points, can be separated by fractionation. In this manner I have separated what I believe to be the lowermost polymer which melts at about 65.5° C. and boils at about 135° C. under atmospheric pressure. This material by analysis has a silicon content equivalent to 81.07% SiO2. A determination of the molecular weight by the freezing point method gives the value 223. The trimer, [(CH3)2SiO]3, has a theoretical molecular weight of 222. Since the only possible structure which conforms to this data is a heterocyclic ring, this is strong evidence that this polymer has the structure.

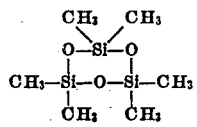

This polymer is crystalline at room temperature and forms flat hexagonal plates which are soluble in organic solvents. The trimeric structure of this polymer was confirmed by X-ray analysis.

In like manner I have separated another polymer having the following composition and properties as measured: silicon equivalents to 81.1% SiO2, melting point 18° C., boiling point 170° C., under atmospheric pressure, and molecular weight 290. The theoretical molecular weight of the cyclic tetramer is 296. Therefore, this polymer has the structure

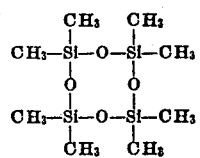

X-ray analysis also showed the polymer to be tetrameric in structure.

At this point it should be mentioned that the above described process was conducted in the substantial absence of air or oxygen. The air which was initially present in the still and condenser was substantially eliminated by expansion and by the sweeping action of the vapors as soon as distillation begins. Exposure of the silicone to air when heated at about 200°–250° C. as by bubbling a stream of air therethrough results in the oxidation and removal of some of the methyl groups, that is, forms some of the monomethyl compounds, which causes copolymerization as described in my copending application Serial No. 353,302 above referred to. Inasmuch as this invention is not concerned with the production of copolymers but aims at the production of the silicone and its separation from the copolymers, it is desirable to prevent such oxidation which may unduly decrease the available amount of silicone and increase the amount of the monoethyl compound in the still residue.

*Example II*

40.9 grams of a copolymer which was insoluble gel composed of 40 mol per cent of dimethyl silicone and 60 mol per cent of monomethyl silicon oxide was gradually heated in a distilling flask up to a dull red heat. The distillate was composed of low polymers of dimethyl silicone and amounted to 18 grams. The calculated amount of silicone present in the original copolymeric gel was 17.2 grams. The monomethyl polymer remained in the still as an infusible granular residue.

*Example III*

Diethyl silicon dichloride was prepared by the Grignard reaction analogous to that described above for the preparation of dimethyl silicon dichloride. The ethyl silicon chlorides composed principally of diethyl silicon dichloride were hydrolyzed by the addition of water and, since the reaction was relatively slow, the mixture was allowed to stand at room temperature overnight. The resulting oily liquid was washed with water and dried under vacuum. It was then distilled under atmospheric pressure, the temperature finally attaining 385° C., at which time a small partly solid residue remained in the still composed chiefly of the monoethyl polymer. On redistillation practically the entire product came over with little change in the amounts of the various fractions up to 380° C. showing that no substantial depolymerization occurred on the second distillation. The distillate was a clear mobile liquid from which no polymers having crystalline characteristics or definite boiling points could be separated by fractionation.

*Example IV*

The distillate from Example III consisting of diethyl silicone was polymerized by heating at 200° C. for 28 hours during which time a stream of air was bubbled through it. This treatment oxidized and eliminated some of the ethyl groups as was evident from the odor of aldehyde and the resulting highly viscous product had therefore become a copolymer of the mono- and diethyl compounds. The viscous copolymer was then distilled and about one-fourth of its volume came over as an oil closely resembling the original oily silicone. In the still a brittle residual mass remained on cooling.

Example V

A copolymer of dimethyl silicone containing unsubstituted silicon atoms was prepared by hydrolyzing a mixture of dimethyl silicon diethoxide and ethyl orthosilicate and dehydrating the hydrolysis product by heat until an insoluble gel was obtained. The gel was then heated in a flask and in the neighborhood of 275° C. it began to liquefy and the liquid distilled off. Heating was continued and the temperature increased until no further liquefaction took place and a foamy solid residue of silica remained in the flask. To ensure complete separation about 0.1 gram of solid sodium hydoxide was added to the thinly fluid distillate and it was redistilled. A small foamy residue of silica remained and the final distillate was pure dimethyl silicone, corresponding in amount to the calculated amount initially present.

Example VI

A copolymer comprising 1.45 and 5.15 parts by weight of mono-phenyl- and dimethyl-silicon oxides respectively and consisting of a thermoplastic solid was placed on a flask and heated. Depolymerization and distillation occurred with a boiling range of 140°–350° C. The distillate was liquid at room temperature and amounted to about 1.5 parts by weight. It was identified as dimethyl silicone.

Example VII

Highly polymerized insoluble dimethyl silicone can by my method be converted to lower soluble polymers. For example, pure dimethyl silicone comprising an insoluble rubbery gel and showing by analysis 81.10% $SiO_2$ was heated in a flask up to 400°–500° C. The rubbery material progressively liquefied and the liquid distilled until substantially nothing was left in the flask. The partly crystalline and partly liquid distillate was identified as low polymers of dimethyl silicone.

Example VIII

Liquid dibutyl silicone was heated in air for 25 hours at 180°–200° C. during which time a slow stream of air was bubbled through it in order to form a copolymer of mono- and di-butyl silicon oxides. The viscosity of the liquid gradually increased due to the oxidation and elimination of some butyl radicals and the formation of monobutyl silicon oxide combined as a copolymer with the silicone. A small amount of powdered NaOH was added and the mixture was heated in a distilling flask. Liquid dibutyl silicone was distilled and a solid residue remained in the flask. The viscosities of the liquid before and after distillation were compared by measuring the times required for a definite quantity thereof to flow from a given pipette. The time of flow for the liquid distillate was 0.6 second as compared with 23.0 seconds required by the more viscous oxidized copolymer.

Example IX

Liquid diamyl silicone was heated in air for 25 hours at 180°–200° C. during which time a slow stream of air was bubbled through it in order to form a copolymer of mono- and di-amyl silicon oxides. The viscosity of the liquid gradually increased due to the oxidation and elimination of some amyl radicals and the formation of monoamyl silicon oxide combined as a copolymer with the silicone. A small amount of powdered NaOH was added and the mixture was heated in a distilling flask. Liquid diamyl silicone was distilled and a solid residue remained in the flask. The viscosities of the liquid before and after distillation were compared by measuring the times required for a definite quantity thereof to flow from a given pipette. The time of flow for the liquid distillate was 1.4 seconds as compared with 281.0 seconds required by the more viscous oxidized copolymer.

Example X

Dibutyl-diethoxy-silane and mono-methyl-triethoxy-silane in the molar ratio 4/3 were mixed and dissolved in dioxan to form a 50% solution by volume. Hydrolysis and copolymerization were effected by the slow addition of an aqueous solution of dioxan containing a trace of HCl as catalyst. The solvent and water were then removed at room temperature by subjecting the solution to reduced pressure. The resulting copolymer was heated in a distilling flask at atmospheric pressure. At first some water was evolved and when the temperature had mounted to about 378° C. dibutyl silicone began to distill and continued until when the temperature of the vapor was in the neighborhood of 400° C. the residual contents of the flask solidified. Distillation then practically ceased and the residue comprised monomethyl silicon oxide and decomposition products of dibutyl silicone, probably the monobutyl silicon oxide.

Example XI

A liquid phenyl ethyl silicone of high viscosity was prepared in the following manner. Phenylethylsilicon dichloride was hydrolyzed by adding it dropwise to water with stirring at room temperature with sufficient water present to make a 10% HCl solution. An oil was recovered having a viscosity of 309 centistokes. This oil which was identified by analysis as phenyl ethyl silicone was then treated with solid sodium hydroxide in such an amount that the ratio of silicon atoms in the silicone to the sodium atoms in the alkali was about 100 to 1 i. e. 1 NaOH molecule per 100 silicon atoms. The mixture was stirred at about 150° C. until a viscous liquid was obtained. This was neutralized by addition to a dilute acid solution of such strength that the acid was always in excess of the alkali present. A liquid phenyl ethyl silicone having a viscosity of 89,500 centistokes was recovered by first washing with water and then drying. This liquid was then divided into three parts.

One part of the above liquid phenyl ethyl silicone was placed in a distilling flask and heated at a pressure of about 14 mm. When the temperature of the liquid reached 360° C., liquid started to come over. Distillation was stopped when the temperature reached 400° C. About 81 per cent of the original charge in the flask had distilled over. The distillate had a viscosity of 104 centistokes while the residue was somewhat more viscous, having a viscosity of approximately 500 centistokes.

The second part of the liquid phenyl ethyl silicone was likewise placed in a distilling flask. A small amount of solid sodium hydroxide was added (1 NaOH molecule per 100 silicon atoms). The contents of the flask were then heated at a pressure of about 14 mm. At 320° C. liquid started to distill over and continued until the heating was discontinued at 340° C. The distillate amounted to about 80% of the original charge and had a viscosity of 206 centistokes. The residue was a fluid liquid having a viscosity of approximately 500 centistokes. The distillate was found to contain principally cyclic trimer and tetramer of phenyl ethyl silicone.

The third portion was heated for 10 minutes at 360° C. in a closed system under its own vapor pressure. It was then found that the viscosity of the liquid phenyl ethyl silicone in the flask had dropped from 89,500 to 6,050 centistokes.

*Example XII*

A compound having the formula

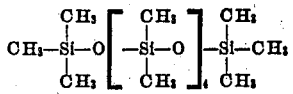

was prepared by the method disclosed in my copending application Serial No. 503,159 filed September 20, 1943, and assigned to the assignee of the present invention. Briefly, this method comprises hydrolyzing a mixture of equimolecular proportions of dimethyldiethoxysilane and trimethylethoxysilane with aqueous sodium hydroxide and recovering the oily hydrolysis product. The latter is then fractionated under vacuum to separate the above compound boiling at 257–8° C. at atmospheric pressure and having a viscosity of 2.63 centistokes at 25° C. A portion of this compound was placed in a distilling flask with solid sodium hydroxide, the amount of the latter being such that the ratio of the number of silicon atoms in the compound to the number of sodium atoms in the alkali was 100 to 1. The mixture was heated at atmospheric pressure. At about 230° C. pot temperature liquid began to distill over and continued to do so until the heating was stopped at 250° C. The distillate amounted to 91 per cent of the original charge and had a viscosity of 1.56 centistokes. Repeated treatments of the distillate with solid alkali and heat produced a liquid which was primarily a mixture of cyclic polymers of dimethyl silicone and hexamethyl disiloxane with only a small amount of volatile copolymers of di-tri methyl composition. This mixture was then readily separated into its components by fractional distillation under vacuum.

In the case of organo-siloxanes which are initially completely distillable such as the above di-tri-methyl copolymer which has a definite boiling point, it is necessary to use alkali as a catalyst in order to promote the depolymerization of the compound at temperatures in the neighborhood of its boiling point. However, heat alone is effective when the temperature is raised above the boiling point which of course, involves conducting the break-down under pressure.

*Example XIII*

A copolymer was prepared by adding a mixture of 80 mol per cent of phenyl ethyl silicon dichloride and 20 mol per cent of silicon tetrachloride in dioxane solution to a dioxan-water solution at room temperature and recovering the oily hydrolysis product. The latter was divided into two parts.

One part was heated at 13–14 mm. in a distilling flask. Liquid started to distill over at a pot temperature of 380° C. and continued to distill up to a pot temperature of 500° C. The distillate amounted to about 52% of the charge and had a viscosity of 306 centistokes. The residue was a gel. Analysis established the distillate to comprise principally cyclic polymers of phenyl ethyl silicone with small amounts of volatile copolymers.

The second part of the copolymer was heated in the presence of solid sodium hydroxide (the amount of sodium being such that there was 1 sodium atom for each 100 silicon atoms in the copolymer). Sixty-one per cent of the charge distilled between 360° and 440°. The residue was a gel. The distillate had a viscosity of 194 centistokes and was identified as substantially pure polymers of phenyl ethyl silicone.

*Example XIV*

A 10.9 gram sample of a gelled diethyl silicone was heated in a Clausen flask with the vacuum at around 0.007 mm. Depolymerization set in at 150–175° C. in the still pot. The temperature was gradually raised to 365° C. The vapor temperature ran from 70° C. initially to 210° C. The distillate, 8.15 grams, had a viscosity of 40 centistokes at 25° C. The residue was also liquid and largely depolymerized.

*Example XV*

Lauryl methyl silicone was prepared by hydrolyzing lauryl methyldiethoxysilane with aqueous acid and recovering the oily hydrolysis product. The silane had been obtained from the reaction of lauryl magnesium halide on methyltriethoxysilane in ether solution. Since the lauryl methyl silicone was a liquid having a viscosity of only 257 centistokes, it was polymerized by heating it at about 60–80° C. in the presence of solid sodium hydroxide (1 NaOH for each 100 silicon atoms) until its viscosity had risen to 2,270 centistokes. It was then heated in a distilling flask without removing of the alkali at a still pot temperature of 300°–360° C., a vapor temperature of 110°–180° C. and a pressure of .003 mm. Most of the liquid in the still distilled over and was found to have a viscosity of 46.5 centistokes.

*Example XVI*

A copolymer consisting essentially of the units $CH_3SiO_{3/2}$ and $(C_6H_5)_2SiO$ in the ratio of 4 to 1 was prepared in the following manner. A mixture of methyltriethoxysilane and diphenylsilicon dichloride in the molar ratio 4 to 1 was warmed to 70–80°. Slightly over the calculated amount of water was added dropwise with good stirring in 30–40 minutes. After stirring the mixture overnight it was again warmed to 70–80° for three hours. The mixture was then washed neutral in toluene solution. An oily material was recovered which had a viscosity of about 108,000 centistokes at 25° C.

A sample of this copolymer was heated in a distilling flask at 17 mm. pressure. The distillate which was 43.4% of the starting material came over between 410–450°. Gelation of the material in the flask took place at 450° C. The distillate had a viscosity of approximately 50,000 centistokes and contained 56.6% $SiO_2$. Had the copolymer distilled unchanged, the $SiO_2$ content would have been 64.4%. It is apparent that depolymerization had occurred. Repeated distillations of the distillate resulted in low molecular weight diphenyl silicone.

Repeating the above experiment with a catalytic amount of sodium hydroxide gave a 16.6% distillate which came over between 340 and 400° C. This was a fluid oil having an $SiO_2$ content of 40.2% showing that depolymerization is more rapid when alkali is present. Repeated distillations with alkali produced a mixture of low molecular weight diphenyl silicone polymers and a non-volatile residue consisting of methylsilicic acid.

*Example XVII*

A sample of high molecular weight diphenyl silicone having a melting point of 260–280° C. was heated in a distilling flask at 18 mm. pressure to determine its thermal behavior. Approximately 25% of the starting material came over between 350–400° C. with a melting point of 195–215° which corresponds to that of the cyclic tetramer of diphenyl silicone mixed with small amounts of other low molecular weight polymers of diphenyl silicone.

Repeating the experiment with a trace of NaOH added to the material gave 40% of the starting material as distillate in two fractions boiling from 300–350° C. One fraction melted at 160–175° C. corresponding approximately to that of diphenyl silicone trimer; the other melted at 190–210° C. corresponding approximately to that of diphenyl silicone tetramer.

*Example XVIII*

A copolymer was prepared by hydrolyzing a mixture of phenylsilicon trichloride and diphenylsilicon dichloride in the molar ratio of 4/1 and recovering an amorphous powder from the hydrolysis product. This powder was heated under 18 mm. pressure in the presence of a trace of NaOH yielding 14.5% distillate between 350–500° C. pot temperature. The material in the flask melted during the heating and then gelled at 450° C. The distillate was part crystalline and part oil. Low polymers of diphenyl silicone were recovered therefrom.

From the above it will be seen that my invention provides a convenient method for the preparation of pure di-organo silicones and also makes possible the recovery or separation thereof from highly polymerized insoluble products consisting of or containing them. In general, the pure di-organo silicones are useful in the liquid form as actuating or damping fluids or as intermediates in the preparation of solid coating compositions for metallic conductors, and the like. The low polymeric forms of dimethyl silicone which are obtainable by my method can easily be polymerized to give useful products by treating them with a catalyst such as hydrochloric acid and heating them. When polymerized to a sufficient extent dimethyl silicone becomes a flexible, insoluble product which provides an excellent coating and impregnating material for fabrics, or for binding fibrous and pulverulent materials or as a protective or insulating coating for metals, enamels, glass, stone, concrete and the like. For coating compositions the polymers may be dissolved in a suitable solvent such as benzene, toluene, etc., and the solution employed for coating various articles and materials. The coating after evaporation of the solvent can be polymerized in situ to an insoluble, flexible composition which is chemically inert, has desirable electrical properties rendering it suitable for electrical insulation and is relatively heat resistant.

I claim:

1. The method of converting high molecular weight polymers of dimethyl silicone to low molecular weight polymers thereof, which comprises heating them in the substantial absence of oxygen under conditions equivalent to a temperature of about 275° C. and above, and a pressure of one atmosphere and collecting the vaporous products.

2. The method of converting high polymers of dimethyl silicone to low polymers thereof, which comprises heating them in the substantial absence of oxygen to a temperature of about 275° C. and above under atmospheric pressure and collecting the vaporous products.

3. The method which comprises heating a high molecular weight methyl siloxane comprising essentially the recurring structural unit

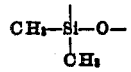

in the substantial absence of oxygen under conditions equivalent to a temperature of about 275° C. and above, and a pressure of one atmosphere and collecting the vaporous products.

4. The method of converting high molecular weight polymers of dimethyl silicone into low molecular weight polymers thereof which comprises heating said high molecular weight polymers to an elevated temperature in the absence of oxygen.

5. The method according to claim 3 in which the siloxane also contains $CH_3SiO_{1.5}$ units.

6. The method of converting a high molecular weight organosiloxane containing the recurring structural unit

where R and R' are organic radicals selected from the group consisting of alkyl and phenyl radicals, into low molecular weight polymers thereof, which comprises heating said organosiloxane to an elevated temperature in the substantial absence of oxygen, and collecting said low molecular weight polymers as a distillate.

7. The method of converting a high molecular weight organosiloxane containing the recurring structural units

and $R''SiO_{1.5}$, into low molecular weight polymers of

where R, R' and R'' are organic radicals selected from the group consisting of alkyl and phenyl radicals, which comprises heating said organosiloxane to an elevated temperature in the substantial absence of oxygen and collecting said low molecular weight polymers as a distillate.

8. The method of converting a high molecular weight organosiloxane containing the recurring structural unit

where R and R' are organic radicals selected from the group consisting of alkyl and phenyl radicals, into low molecular weight polymers thereof, which comprises heating said organosiloxane to an elevated temperature in the substantial absence of oxygen, and in the presence of a minor amount of an alkali metal hydroxide and collecting said low molecular weight polymers as a distillate.

9. The method of converting a high molecular weight organosiloxane containing the recurring structural units

and R″SiO$_{1.5}$ into low molecular weight polymers of

where R, R' and R″ are organic radicals selected from the group consisting of alkyl and phenyl radicals, which comprises heating said organosiloxane to an elevated temperature in the substantial absence of oxygen, and in the presence of a minor amount of an alkali metal hydroxide and collecting said low molecular weight polymers as a distillate.

10. The method of converting high molecular weight organosiloxanes containing the recurring structural unit

where R is an alkyl radical into low molecular weight polymers thereof which comprises heating said high molecular weight organosiloxane to an elevated temperature in the substantial absence of oxygen and collecting said low molecular weight polymers as a distillate.

11. The method of converting high molecular weight methyl siloxanes containing the recurring structural unit

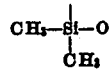

into low molecular weight polymers thereof which comprises heating said high molecular weight methyl siloxane to an elevated temperature in the substantial absence of oxygen and in the presence of a minor amount of an alkali metal hydroxide and collecting said low molecular weight polymers as a distillate.

12. The method of converting high molecular weight methyl siloxanes containing the structural unit

and also the unit CH$_3$SiO$_{1.5}$ into low molecular weight polymers of

which comprises heating said high molecular weight methyl siloxane to an elevated temperature in the substantial absence of oxygen and in the presence of a minor amount of an alkali metal hydroxide and collecting said low molecular weight polymers as a distillate.

13. The method of converting high molecular weight organosiloxanes containing the structural unit

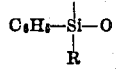

where R is an alkyl radical into low molecular weight polymers thereof which comprises heating said high molecular weight organosiloxanes to an elevated temperature in the substantial absence of oxygen and collecting said low molecular weight polymers as a distillate.

JAMES FRANKLIN HYDE.

REFERENCES CITED

The following references are of record in the file of this patent:

UNITED STATES PATENTS

| Number | Name | Date |
|---|---|---|
| 2,258,218 | Rochow | Oct. 7, 1941 |
| 2,371,068 | Rochow | Mar. 6, 1945 |

FOREIGN PATENTS

| Number | Country | Date |
|---|---|---|
| 113,708 | Australia | Aug. 19, 1941 |

OTHER REFERENCES

Pink and Kipping: "Jour. Chem. Soc.," (London), vol. 123, pages 2834–7.

Kipping: "Jour. Chem. Soc.," (London), vol. 101, pages 2131–2141 (1912).

Hyde: "Jour. Am. Chem. Soc.," vol. 63, pages 1194–6 (1941).

Rochow: "Jour. Am. Chem. Soc.," vol. 63, pages 798–800 (1941).